Sept. 17, 1968  H. EILENBERG ET AL  3,401,468
PRODUCT CONTAINER FOR FREEZE DRYING
Filed March 1, 1967  2 Sheets-Sheet 1

HANS EILENBERG
FRANZ-JOSEF SCHMITZ
INVENTORS.

BY Peter J. Murphy
ATTORNEY.

United States Patent Office 3,401,468
Patented Sept. 17, 1968

3,401,468
PRODUCT CONTAINER FOR FREEZE DRYING
Hans Eilenberg, Rosrath, and Franz-Josef Schmitz, Weiden, Germany, assignors to Leybold-Anlagen Holding A.G., Zug, Switzerland, a corporation of Switzerland
Filed Mar. 1, 1967, Ser. No. 619,689
Claims priority, application Germany, Mar. 8, 1966, L 53,037
10 Claims. (Cl. 34—237)

ABSTRACT OF THE DISCLOSURE

An open-topped tray-like container for a granulated product, including a tray member which is fabricated from a metal for the purpose of conducting heat to the product, and which may have partitions to form compartments. Vapor permeable metallic liners are provided adjacent to certain of the container walls, permitting the passage of vapor from the product, and are supported in spaced relation to the walls surfaces to define vent passages for passing the vapor from the container. The liners have sufficient intimate contact with the walls of the tray member so that heat may be conducted through the liners to the product.

Background of the invention

This invention is concerned with the freeze drying of a granulated or particulate product such as instant coffee or pharmaceuticals. Very generally, this process is concerned with the freezing of the product whereby all the moisture contained in the product is converted to ice, then applying heat to the product in an atmosphere of reduced pressure to vaporize or sublime the ice and remove it from the product. From the standpoint of the efficiency of the freeze dry process, it is desirable to effect the removal of the moisture from the product in the shortest possible time. One aspect of an efficient process is concerned with the application of heat to the product; and for this purpose trays of the type illustrated in the drawings of the present application have been developed for use with granulated products. These trays are fabricated from a good heat conductive metal such as aluminum; and are provided with the longitudinal ribs or partitions to provide increased surface area for transferring the heat to the product.

In some freeze dry systems, the product containing trays are placed on heated shelves in a vacuum chamber, the heat from the shelves being conducted through the trays to the product. In other systems the trays are supported in spaced relation to heat radiating elements, wherein the trays are heated by radiation and the product is again heated by conduction of the heat through the trays.

Another aspect of an efficient freeze dry process is the withdrawal of moisture in the form of vapor. An inherent problem with a granulated or powdered product is that the product, when placed in a tray, forms a bed which presents a certain impedance to the flow of vapor, the impedance depending of course on the form and size of the granules and the distance through which the vapor must flow in the bed. The depth of the containers then, or of the beds of granulated product in the container, is necessarily limited to a depth which will permit withdrawal of all of the vapor from the product within a reasonable time period. The depth of a tray for use in this process then must necessarily be limited, unless other means are provided for the removal of vapor from the product.

Summary of the invention

An object of the invention is to provide a novel container for the drying of granulated material which provides additional vent passages for the removal of vapor and other gases from the product.

A container, according to the invention, comprises an open-topped tray-like member having bottom and side walls, and the combination therewith of a vapor permeable liner disposed adjacent to one or more of the walls; the liners being spaced from the walls to define vent chambers or passages for receiving vapor from the product and passing the vapor to the exterior of the container. Containers according to the invention may be larger and deeper since vapor may be removed from the product beds through vent passages adjacent to the bottom or side walls of the container, for example, as well as from the normally exposed upper surfaces of the beds. Through the use of the invention, larger beds may be dried with acceptable efficiency, or smaller beds may be dried with much improved efficiency.

Description of the preferred embodiments

Figure 1:
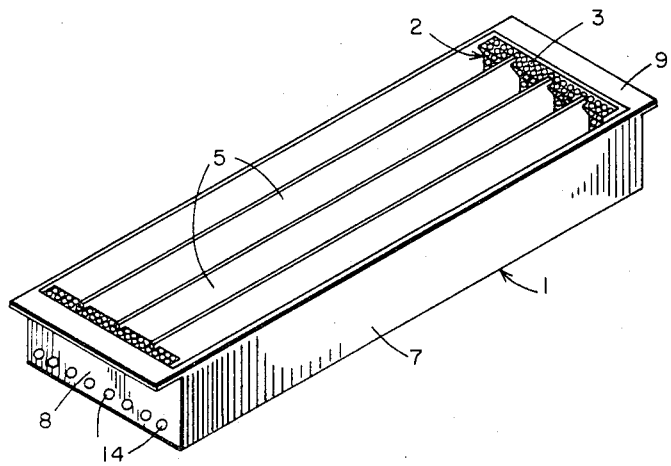
FIG. 1 is a perspective view of a product container according to the present invention.
Figure 2:
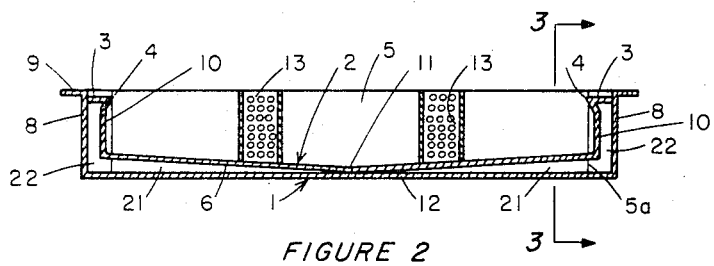
FIG. 2 is a longitudinal section taken in a vertical plane through one of the compartments of the container of FIG. 1.
Figure 3:
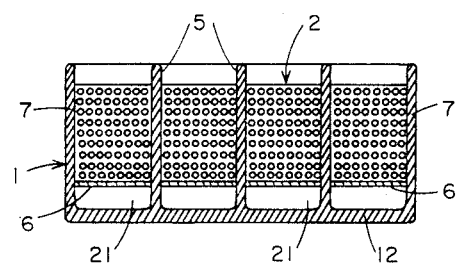
FIG. 3 is a transverse section taken along the line 3—3 of FIG. 2, looking in the direction of the appended arrows.

Referring to FIGS. 1, 2, and 3 of the drawing, there is shown one from of product container according to the present invention. This container includes a tray 1, of known construction, which is fabricated preferably from a good heat conductive material such as aluminum. The tray 1 is of a design which may be fabricated by an extrusion process; and consists of a bottom wall 12, side walls 7, and end walls 8. The end walls are bent outwardly to form flanges 9 which lie in the plane defined by the top of a tray, and form convenient members for handling the tray. The tray also includes a plurality of longitudinal ribs 5 which form partitions dividing the tray into four longitudinal compartments. These partitions 5 do not extend to the end walls 8, but terminate short of the end walls as indicated by the terminal edge 5a in FIG. 2. This construction results when the trays are fabricated by the extrusion process which may produce a strip originally defining a base strip with perpendicular ribs 5. The tray is then formed by cutting the strip to the desired length, machining away portions of the rib partitions 5 at the ends thereof, then forming the side and end walls by bending portions of the strip upward and lastly forming the flanges 9. The spaces between the ends of the rib partitions 5 and the end walls 8 are necessitated by the tool which forms the end walls 8. The structure of the tray 1, as such, forms no part of the present invention.

The container also includes a liner 2, which is preferably fabricated from a good heat conducting material such as aluminum or other metal. The liner 2 may take the form of a metallic sheet having generally uniformly distributed perforations or slit openings which will permit the passage of vapor while retaining the granulated material; or it may take the form of a wire mesh screen, for example. The liner of FIGS. 1, 2, and 3 consists of four parallel strip portions, adapted to be received in the four compartments of the tray 1, and common connecting end portions; the liner being formed as will be described. Referring particularly to FIG. 2, the strip portions of the liner 2 form generally horizontal bottom walls 6; and the common end portions of the liner are bent upwardly to form generally vertical end walls 10 and then outwardly to form generally horizontal support portions 3. The width of the support portions 3, which is the longitudinal dimension in relation to the length of the tray 1, is somewhat greater than the distance between the ends 5a of the partitions 5 and of the tray end walls 8. A relatively sharp ridge 4 is provided where the support portions 3 of the liner meet the end walls 10; and this relatively sharp ridge is provided so that the support portion 3 might be wedged into the space between the tray end wall 8 and partitions 5 for the purpose of supporting the ends of the liner 2. The height of the liner end walls 10 is less than the height of the tray 8 so that the bottom wall 6 of the liner is supported in spaced relation to the bottom wall 12 of the tray, at the ends of the tray. The liner bottom wall 6, while generally horizontal, is actually bent to define a very shallow V in longitudinal section as seen in FIG. 2, the V being defined by a bend 11 intermediate the ends of the strips defining the bottom walls 6.

For the efficient drying of granulated product, it is desirable to conduct the heat to the material as rapidly as possible; and one way to accomplish this is to provide maximum heat transfer surface between the container and the product. It is for this reason that the partitions 5 are provided in the trays for a granulated product. For the same reason, the above-described liner 2 is preferably fabricated of a good heat conducting material such as aluminum; and, additionally, the liner should have intimate contact with the tray 1 for the efficient conduction of heat from the tray to the liner. Such intimate contact is provided by the above-described wedging of the support portions 3 of the liner into the tray structure; and additional contact is provided where the bends 11 of the V-shaped liner bottom walls engage the bottom wall 12 of the tray. There will, of course, be some additional contact between the edges of the liner bottom walls 6 with the surfaces of the tray side walls 7 and partitions 5; however, normally the width of these strips would be designed for relatively easy insertion and removal of the liner, for the purpose of washing these parts after each use.

The above-described assembly provides vent spaces 21, defined between the bottom walls 6 and 12 of the liner and tray respectively, the vent spaces or passages 21 communicating with vertical vent spaces or passages 22 defined between the end walls 10 and 8 of the liner and tray respectively. The vent spaces 22 communicate with the exterior of the container assembly through the perforations or openings in the support portions 3 of the liner 2.

With the above described arrangement, when the container is filled with granulated product to a level near the top of the container, the granulated product will be supported by the liner 2 so that the vent spaces will be maintained underneath the bed of granulated product and at the ends thereof. When the container is now placed in a vacuum chamber, the vapor within the product may pass either upwardly to the surrounding atmosphere at the upper surface of the bed or may pass downwardly through the vapor permeable bottom wall 6 of the liner 2, and then pass to the exterior of the container through the vent spaces or passages 21 and 22. It may be seen then that the water vapor, or other gas, need pass through only half the distance within the bed, which would otherwise be required were it not for the liner 2 and defined vent spaces.

Alternative means are also shown for communicating the vent spaces 21 and 22 with the exterior of the container. As shown in FIG. 1, for example, the end walls 8 of the tray 1 may be provided with suitable holes 14 which provide additional paths for removing the vapor from the vent spaces 22.

In FIG. 2 there is shown another form of vent passage which consists of tubular vent members 13 supported on the bottom wall 6 of the liner and extending upwardly to a point adjacent to the top of the container. These tubular vent members 13 may merely define vents for the horizontal vent spaces 21, and in that sense may be fabricated of a solid material; or the vent members 13 may be formed of a vapor permeable material similar to that of which the liner 2 is fabricated. When constructed of a vapor permeable material, of course, the vapor from the product bed may pass laterally to the tubular vent members 13.

Figure 4:
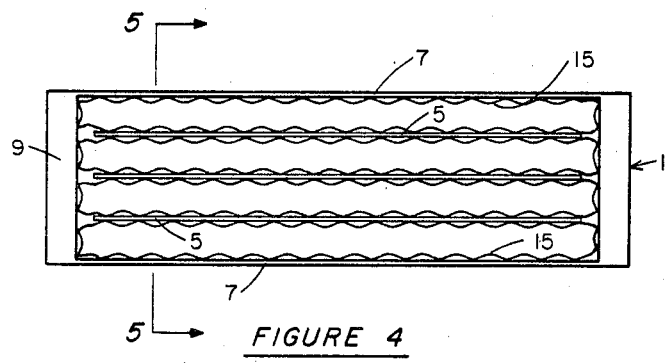
FIG. 4 is a plan view of a modified form of product container according to the present invention.
Figure 5:
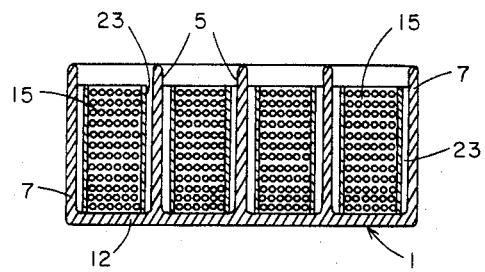
FIG. 5 is a transverse section taken along the line 5—5 of FIG. 4, looking in the direction of the appended arrows.

Referring to FIGS. 4 and 5 of the drawing, there is shown another form of product container according to the present invention. This container also includes a tray 1 having the same construction as the tray already described, the parts being identified by the same reference numbers. In this form of container, each of the compartments is provided with a liner 15 for the side and end walls thereof. The liner may be in the form of a continuous strip of vapor permeable material such as a perforated metal or wire mesh screen; the strip being dimensioned to fit within each compartment adjacent the walls and suitably spaced therefrom to define the desired vent spaces. A preferred form of liner construction, is that the liner strip be provided in a wave or corrugated form, the corrugations being provided transverse to the length of the liner strip. When the strips are then inserted into the tray compartments, the corrugations provide contact ridges which engage the walls and partitions at spaced intervals around the periphery of the compartments, to provide for the conducting of heat from the tray 1 to the liner 15. The corrugations also define vent spaces or passages 23 spaced around the periphery of the compartments, which extend from the bottom wall 12 of the tray to the top thereof. With this form of container, the vapor being withdrawn from the bed of granulated product may take the shortest path which is either to the upper surface of the bed or laterally to the vent spaces 23 at the sides of the bed so that the vapor may then pass upwardly through the vent spaces.

A feature of the corrugated structure of the liner 15 is that it incorporates self-contained means for spacing itself relative to the walls of the tray; and, of course, defining the vent spaces 23. Another feature of this corrugated structure of the liner is that it increases the surface area of the liner which contacts the granulated product, and therefore provides improved heat transfer to the granulated product.

Figure 6:
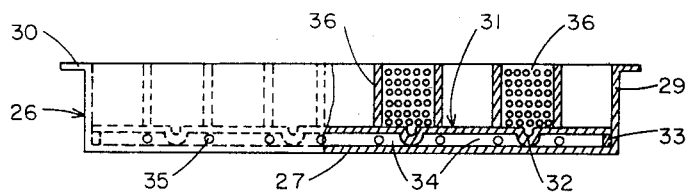
FIG. 6 is a longitudinal sectional view of still another modified form of product container according to the present invention.

Referring to FIG. 6, there is shown still another form of container according to the present invention. The container there illustrated includes a tray 26 which may or may not be provided with the individual longitudinal partitions of the tray 1; the tray consisting of bottom wall 27, side walls 28, end walls 29, and support flanges 30. In this container, a liner 31 is provided for the bottom wall 27, the liner again being preferably fabricated from a vapor permeable heat conductive material such as a perforated aluminum sheet or a wire mesh screen. The liner 31 is supported in spaced relation to the tray bottom wall 27 by means of bosses 32, provided by forming spaced creases or corrugations in the liner 31 intermediate the ends thereof and by turning down the end portions 33 of the liner.

The liner 31, then, together with the bottom wall 27 of the tray 26 defines longitudinally spaced vent spaces 34 which are separated by the support bosses 32. These vent spaces 34 may be communicated with the exterior of the container through appropriately spaced holes 35 provided in the side walls 28 of the tray adjacent to the bottom wall. With this arrangement, the vapor being withdrawn from the bed of granulated product may pass either upwardly to the upper surface of the bed, or downwardly through the vapor permeable liner 31 and through the vent spaces 34 and openings 35, the vapor of course taking the path of least resistance.

The above-described liner 31 may be provided with tubular vent members 36 shown as being fabricated of the same vapor permeable metallic material as the liner 31. Such tubular vent members might be spaced longitudinally on the liner 31 and also laterally to provide a suitable dimensional orientation whereby the vapors from the bed of granulated material may pass laterally to the tubular vent members in addition to passing either upwardly or downwardly.

In another modified form of container, the vent members 36 may be relatively small in diameter, solid wall tubular members which serve to provide vent passage between the vent spaces 34 and the exterior of the container, either in lieu of or in addition to the holes 35 provided in the walls of the container.

What is claimed is:

1. A container for granulated material comprising a tray member formed of bottom and side walls; said tray member being fabricated from a heat conductive material; wherein the improvement comprises the combination therewith of a vapor permeable liner for one or more of said walls; said liner being fabricated from a heat conductive material; and means for supporting said liner in spaced relation to said walls to define vent spaces therebetween; said vent spaces communicating with the exterior of said container.

2. A container as set forth in claim 1 wherein said liner defines a bottom wall and two side walls; means for supporting said liner bottom wall in spaced relation to said tray member bottom wall, and said liner side walls in spaced relation to adjacent side walls of said tray member, to define vent spaces between the respective bottom walls and between the respective side walls; and the bottom vent space being communicated with the exterior of the container through the side vent spaces.

3. A container as set forth in claim 1 wherein said liner defines a generally horizontal bottom wall and generally upright side walls; said liner having means engaging said tray member for supporting its side walls in spaced relation to the side and bottom walls of said tray member; and a portion of said liner bottom wall, intermediate its ends, engaging said tray member bottom wall.

4. A container as set forth in claim 1 wherein said liner comprises a generally flat member dimensioned to be coextensive with said tray member bottom wall; means for supporting said liner in spaced relation to said bottom wall to define a vent space therebetween; and the walls of said tray member having openings therein communicating with said vent space.

5. A container as set forth in claim 4 wherein said tray member openings are provided in its side walls adjacent to its bottom wall.

6. A container as set forth in claim 1 wherein said liner comprises a generally flat member dimensioned to be coextensive with said tray member bottom wall; means for supporting said liner in spaced relation to said bottom wall to define a vent space therebetween; tubular vent members mounted on said liner, extending upwardly therefrom and terminating adjacent to the top of said tray member; and said vent members communicating said vent space with the exterior of said container.

7. A container as set forth in claim 6 wherein said tubular vent members are fabricated from a vapor permeable, heat conductive material.

8. A container as set forth in claim 1 wherein said liner is defined by a wall disposed adjacent to one or more of the side walls of said tray member; and said liner defining, with said tray member side walls, vent spaces opening to the top of said container.

9. A container as set forth in claim 8 wherein liner is corrugated to support said liner in said spaced relation to the side walls of said tray member; and said liner defining vent spaces spaced along the side walls of said tray member and opening to the top of said container.

10. A container as set forth in claim 1 wherein said tray member includes partitions defining a plurality of compartments; and wherein each of said compartments is provided with one of said liners.

References Cited

UNITED STATES PATENTS

| | | | |
|---|---|---|---|
| 1,745,805 | 2/1930 | Miller | 34—238 |
| 3,247,602 | 4/1966 | Hamilton et al. | 34—237 |
| 3,261,110 | 7/1966 | Fuentevilla | 34—237 |

KENNETH W. SPRAGUE, *Primary Examiner.*